April 23, 1929.  B. H. RUNYAN  1,710,430
INSTRUMENT BOARD ATTACHMENT
Filed May 5, 1927  2 Sheets-Sheet 1

Bernard H. Runyan, Inventor

By C.A. Snow & Co.
Attorneys

April 23, 1929.  B. H. RUNYAN  1,710,430
INSTRUMENT BOARD ATTACHMENT
Filed May 5, 1927   2 Sheets-Sheet 2
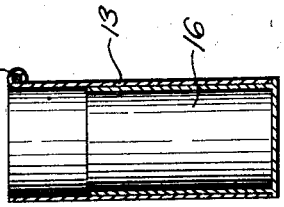
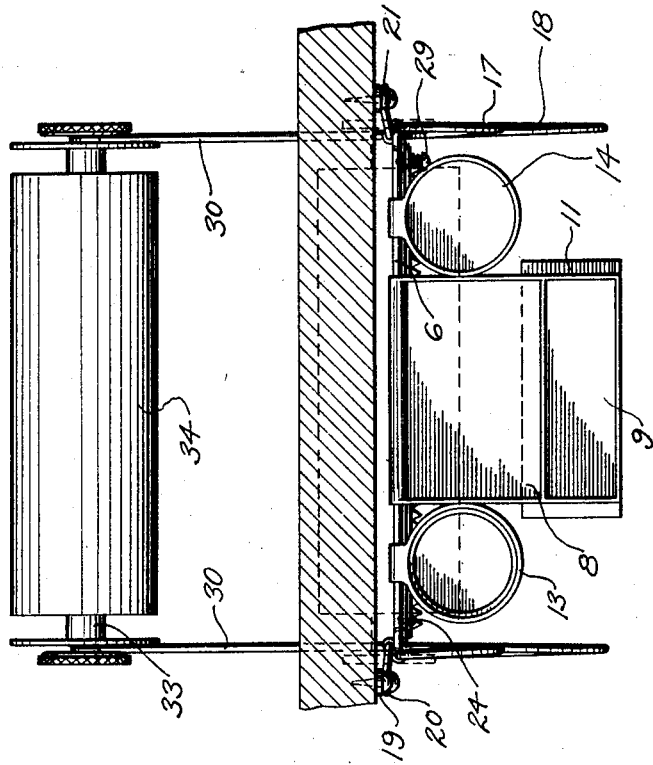
*Bernard H. Runyan* Inventor
By C.A.Snow &Co.
Attorneys Patented Apr. 23, 1929.

1,710,430

UNITED STATES PATENT OFFICE.

BERNARD H. RUNYAN, OF FORT MYERS, FLORIDA.

INSTRUMENT-BOARD ATTACHMENT.

Application filed May 5, 1927. Serial No. 189,108.

The present invention has reference to a device especially designed for use in connection with instrument boards of motor vehicles, and aims to provide novel means whereby articles for personal use may be conveniently supported so that the driver of the motor vehicle, may have easy access thereto.

Another object of the invention is to provide a device of this character which may be readily and easily positioned on instrument boards of motor vehicles, eliminating the necessity of making alterations in the instrument board construction to install the device.

A further object of the invention is to provide a device of this character including a roll of cloth material which may be normally supported out of sight, but which may be readily brought into use should the operator wish to use the same for wiping his hands.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a plan view of the device, the instrument board being shown in section.

Figure 4 is a vertical sectional view through one of the receptacles forming a part of the device.

Figure 2:
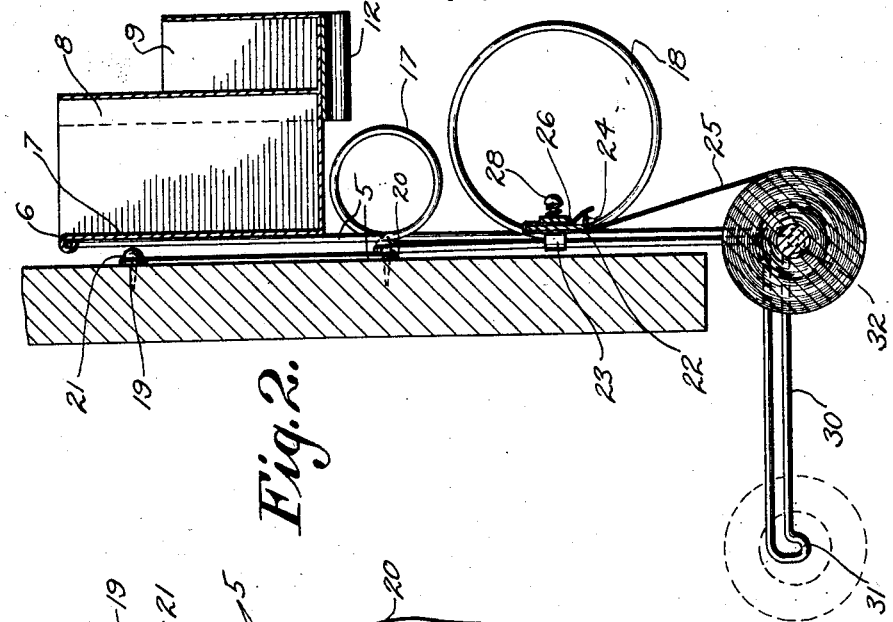
Figure 2 is an end elevational view thereof.
Figure 1:
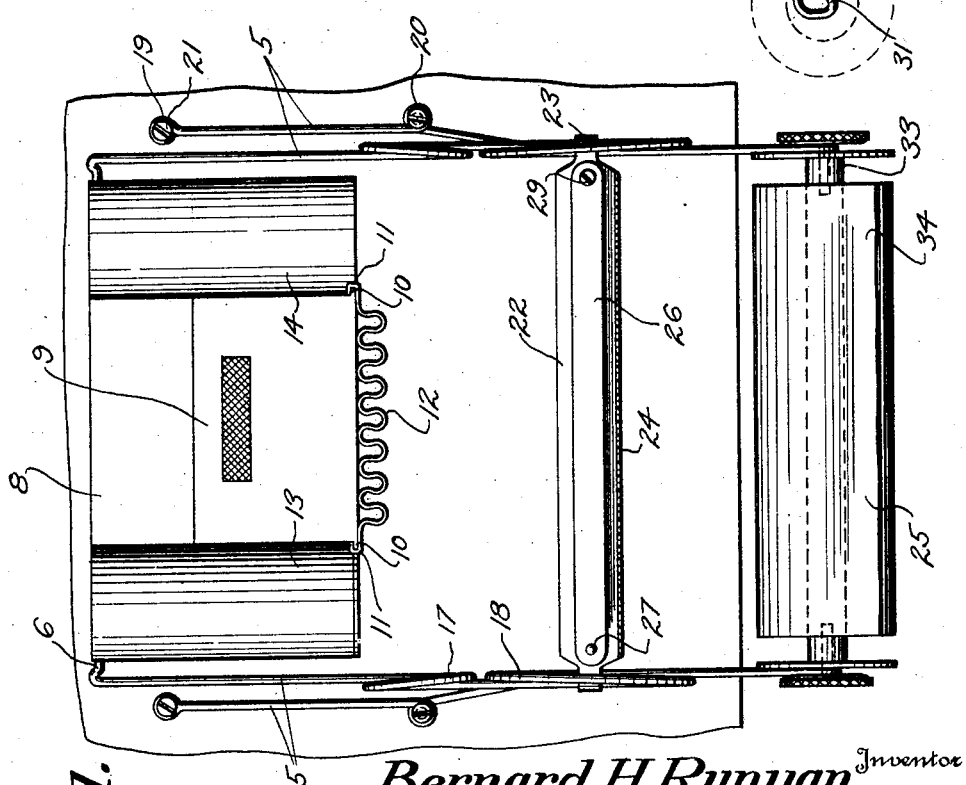
Figure 1 is a front elevational view illustrating a device constructed in accordance with the invention as installed on an instrument board.

Referring to the drawings in detail, the device embodies a length of wire bent intermediate its ends to provide lateral legs 5 arranged in pairs at each side of the device.

The intermediate portion of the length of wire defines a support 6 over which the upper end of the rear wall 7 of the container 8 is clamped, as clearly shown by Figure 2 of the drawings. Forming a part of the container 8 is a forward match container 9 which is designed to receive a box of safety matches, although it is to be understood that the same may be conveniently employed for supporting the usual sulphur match which may be lighted on surfaces other than the box in which they are contained.

At the base of the container 9 are lateral flanges 10 which cooperate with the inturned ends 11 of the corrugated plate 12 which is formed of flexible material, the corrugations being designed to provide pockets for the reception of valve plungers, to the end that valve plungers may be conveniently supported for easy access to facilitate replacement of valve plungers.

Supported on opposite sides of the container 8, are tubular containers 13 and 14 respectively, each of which being provided with a tongue 15 adapted to be bent over the portion 6 of the device.

As shown, the container 13 is provided with a removable section 16, which may be readily and easily removed when it is desired to empty the contents of the container, it being contemplated to employ the container 13 as an ash receiver.

The container 14 is of a size to receive a tire gauge so that the operator may have the same before him at all times. One of each of the legs 5 is provided with an upper loop 17 and a substantially large lower loop 18, the loops of the legs 5 at opposite sides of the device being in alignment so that articles such as road maps, pipe, spark plugs or the like may be supported therein, for the convenience of the driver.

The opposite leg 5 at each side of the device is formed with eyes 19 and 20 respectively, for the reception of the securing nails 21, by means of which the device may be secured to the instrument board. Forming a part of the device is a bar 22 which has extensions 23 at its ends adapted to be positioned around one of the leg members 5 at each side of the device, and adjacent to the loops 18, the bar 5 having teeth 24 formed along its lower edge designed to pierce the cloth material 25 which is pulled thereover, so that the cloth may be conveniently torn and used to wipe grease from the hands of the operator.

Associated with the bar 22 and supported thereby, is a bar 26, one end of the bar 26 being pivotally connected to the bar 22 as at 27, the opposite end of the bar 26 being normally urged towards the bar 22 by means of the coiled spring 28 supported on the threaded bolt 29, the coiled spring bearing against the bar 26 to set up a binding action between the bars 22, 26 and cloth material passing therebetween.

As shown by Figure 2, the device includes rearwardly extended portions 30 that have depressed portions 31 and 32 respectively at their forward and rear ends. These rearwardly extended portions are in direct alignment and act as a support for the shaft 33 that supports the roll 34, the shaft being designed to fall into the depressed portions 31, when it is desired to hold the roll in its inactive position, but moved to a position to rest in the depressions 32 when the roll is moved to its active position, or to a position whereby the cloth material is to be cut for removal from the roll of material.

Due to the construction shown and described, the outer legs 5 may be forced away from the inner legs 5 and an article forced therebetween, the article being for example, a tobacco can or the like.

Thus it will be seen that various articles for personal use may be conveniently supported in ready access to the operator of the vehicle, without the necessity of the operator placing his hands in his pockets to remove articles.

I claim:

A holder of the class described including a length of wire material bent intermediate its ends to provide a supporting rod, each end of the length of wire material being bent upon itself to provide spaced forwardly extended supporting sections, depressed portions at the forward and rear ends of the forwardly extended supporting sections to receive the shaft of a roll support, and portions of the ends of the wire being formed into loops.

In testimony that I claim the foregoing as my own, I have hereto affixed my signature.

BERNARD H. RUNYAN.